United States Patent
Amano et al.

(10) Patent No.: US 10,641,335 B2
(45) Date of Patent: May 5, 2020

(54) BALL BEARING AND MAIN SHAFT DEVICE FOR MACHINE TOOL

(71) Applicant: NSK LTD., Tokyo (JP)

(72) Inventors: Ryosuke Amano, Fujisawa (JP); Yoshiaki Katsuno, Fujisawa (JP); Kyohei Matsunaga, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/322,327

(22) PCT Filed: Aug. 2, 2017

(86) PCT No.: PCT/JP2017/028086
§ 371 (c)(1),
(2) Date: Jan. 31, 2019

(87) PCT Pub. No.: WO2018/025918
PCT Pub. Date: Feb. 8, 2018

(65) Prior Publication Data
US 2019/0186546 A1 Jun. 20, 2019

(30) Foreign Application Priority Data
Aug. 3, 2016 (JP) .................... 2016-153246

(51) Int. Cl.
*F16C 33/66* (2006.01)
*F16C 19/16* (2006.01)
(Continued)

(52) U.S. Cl.
CPC .......... *F16C 33/6659* (2013.01); *F16C 19/16* (2013.01); *F16C 33/583* (2013.01);
(Continued)

(58) Field of Classification Search
CPC ...... F16C 19/16; F16C 19/163; F16C 19/166; F16C 33/6659; F16C 33/7886
See application file for complete search history.

(56) References Cited

U.S. PATENT DOCUMENTS 5,183,342 A 2/1993 Daiber et al.
8,753,016 B2 * 6/2014 Matsuyama ......... B23Q 11/122
384/471
(Continued)

FOREIGN PATENT DOCUMENTS

CN 202493577 U 10/2012
CN 202971589 U 6/2013
(Continued)

OTHER PUBLICATIONS

Communication dated Jul. 2, 2019, from the European Patent Office in counterpart European Application No. 17837020.1.
(Continued)

*Primary Examiner* — Phillip A Johnson
(74) *Attorney, Agent, or Firm* — Sughrue Mion, PLLC

(57) ABSTRACT

When inner diameter side opening portions are projected on an outer circumferential surface of a retainer along extension lines of central lines of radial holes, at least parts of the inner diameter side opening portions of a plurality of radial holes of an outer ring are positioned within an area of two circles formed by connecting each of axial end portions of adjacent pockets of the retainer in an axial direction. When a central line of any one radial hole coincides with a circumferential phase of a center of a ball, any other radial hole is formed such that the projected inner diameter side opening portion is separated from the ball and an inner circumferential surface of the pocket when viewed from the radial direction
(Continued)

of the ball bearing, and a central line of the other radial hole overlaps with the pocket when viewed from the axial direction.

10 Claims, 9 Drawing Sheets

(51) Int. Cl.
  *F16C 33/58* (2006.01)
  *F16C 33/78* (2006.01)
(52) U.S. Cl.
  CPC ........ *F16C 33/6662* (2013.01); *F16C 33/782* (2013.01); *F16C 19/163* (2013.01); *F16C 33/586* (2013.01); *F16C 2322/39* (2013.01)

(56) References Cited

U.S. PATENT DOCUMENTS

| | | | | |
|---|---|---|---|---|
| 8,956,050 | B2* | 2/2015 | Kosugi | F16C 33/58 |
| | | | | 384/475 |
| 10,001,170 | B2* | 6/2018 | Yoshino | F16N 7/32 |
| 2013/0202237 | A1 | 8/2013 | Kosugi | |

FOREIGN PATENT DOCUMENTS

| | | | | |
|---|---|---|---|---|
| CN | 105443581 A | | 3/2016 | |
| CN | 105605101 A | | 5/2016 | |
| DE | 10 2006 012 001 A1 | | 9/2007 | |
| DE | 10 2007 034 023 A1 | | 1/2009 | |
| DE | 102012222628 A1 | * | 6/2014 | .......... F16C 33/6648 |
| DE | 10 2014 201 933 A1 | | 8/2015 | |
| DE | 102016222415 A1 | * | 5/2018 | ............ F16C 33/586 |
| EP | 1541884 A1 | * | 6/2005 | .......... F16C 33/7893 |
| JP | 11062991 A | | 3/1999 | |
| JP | 11264420 A | | 9/1999 | |
| JP | 2002054451 A | * | 2/2002 | .......... F16C 33/6659 |
| JP | 2002-81441 A | | 3/2002 | |
| JP | 2008-151180 A | | 7/2008 | |
| JP | 2009-180239 A | | 8/2009 | |
| JP | 2011163465 A | | 8/2011 | |
| JP | 2012-7681 A | | 1/2012 | |
| JP | 2013015152 A | | 1/2013 | |
| JP | 201379711 A | | 5/2013 | |

OTHER PUBLICATIONS

International Search Report (PCT/ISA/210), issued by International Searching Authority in corresponding International Application No. PCT/JP2017/028086, dated Oct. 10, 2017.

Written Opinion (PCT/ISA/237) issued by the International Searching Authority in corresponding International Application No. PCT/JP2017/028086, dated Oct. 10, 2017.

Communication dated Oct. 30, 2019, issued by the Chinese Patent Office in counterpart Chinese Application No. 201780048989.5.

* cited by examiner

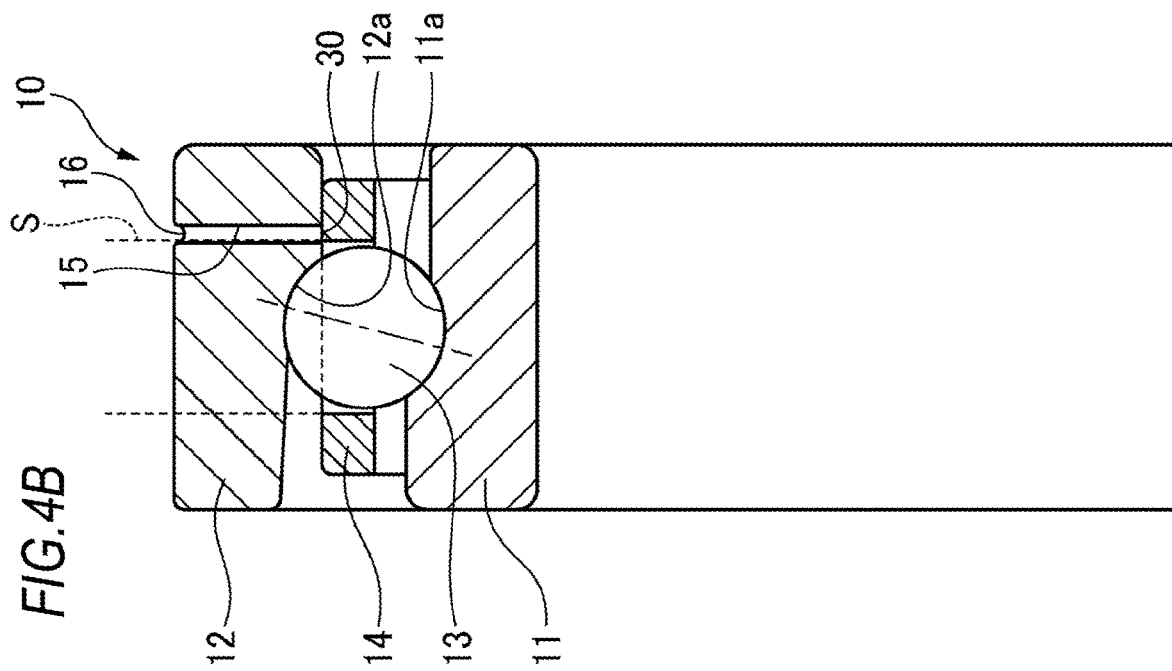
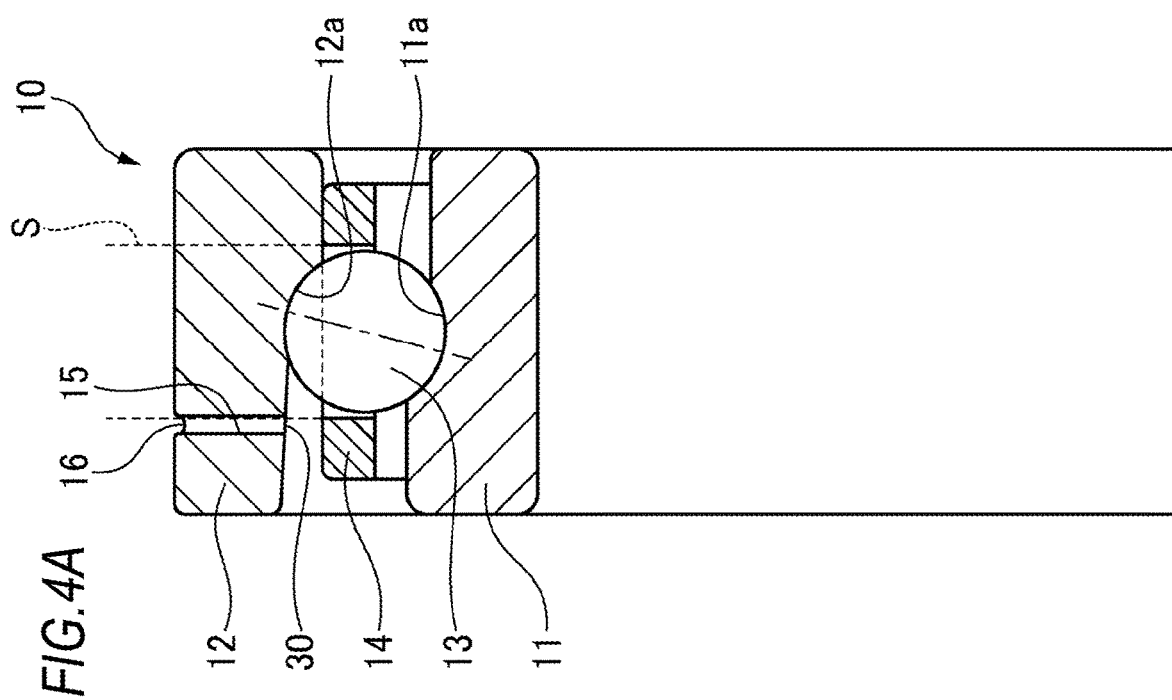

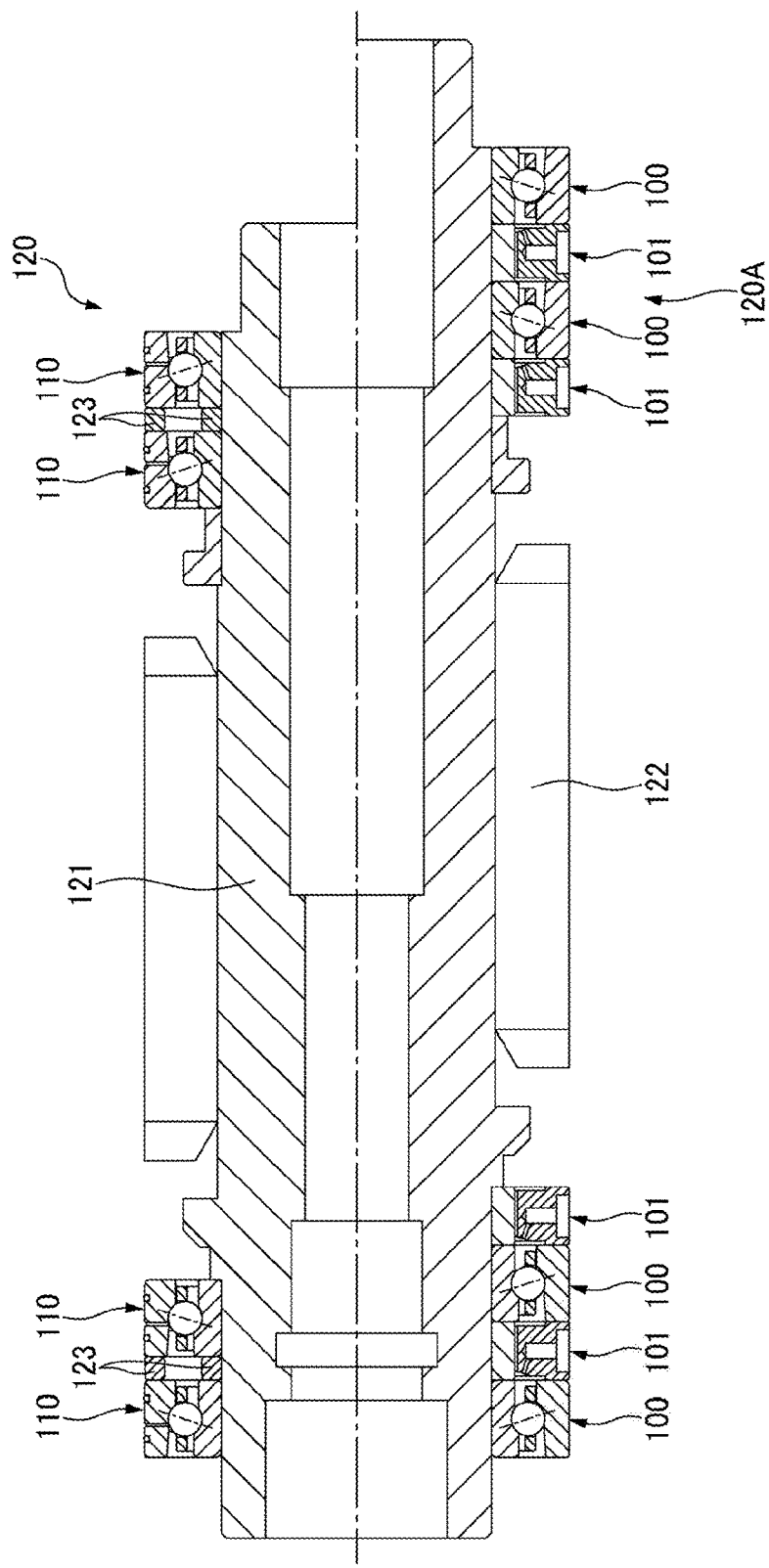

BALL BEARING AND MAIN SHAFT DEVICE FOR MACHINE TOOL

TECHNICAL FIELD

The invention relates to a ball bearing and a spindle device for a machine tool, and particularly to an outer ring oil-supply type ball bearing and a spindle device for a machine tool.

BACKGROUND ART

In recent years, in a spindle for a machine tool, a demand for high-speed operation increases for improvement of cutting efficiency. In addition, recently, in the spindle, for improvement of production efficiency, a need to correspond to a five-axis machining tool capable of machining a workpiece having a complicated shape without using a plurality of machine tools and without a changeover emerges. In the five-axis machining tool, the spindle or the table turns. Thus, the shortening of the axial length of the spindle is required due to the demands for the space saving by the shortening of the turning radius, the power saving by the inertia reduction in turning and the weight reduction, or the like.

Grease lubrication, oil-air lubrication, oil-mist lubrication or the like is exemplified as a lubricating method which is widely adopted for a rolling bearing for the machine tool spindle. Generally, the oil-air lubrication is adopted in the area of high-speed rotation (dmn 800,000 or more). As oil-air lubrication of the related arts, there is known a system of supplying a high-pressure air and fine oil particles from a side surface of a bearing into the bearing by using an oil supplying nozzle piece 101 arranged on the side of a bearing 100 illustrated in FIG. 9A or the oil supplying nozzle piece 101 inserted into a radial through-hole 102a of an outer ring spacer 102 arranged on the side of the bearing 100 illustrated in FIG. 9B.

In this system, an oil supplying component such as the nozzle piece 101 is required additionally, and the number of the spindles increases. This leads to an increase in the cost of the entire spindle and the effort for management. In addition, since the nozzle piece 101 is used, the shape of the outer ring spacer and the structure of the housing become complicated, and the effort of designing and machining the spindle increases. Further, since the nozzle piece 101 is provided on the side surface of the bearing in the rotational axial direction, a certain degree of the spacer length is required, and the axial length of the spindle is elongated. Accordingly, the size of the machine tool itself increases, the weight of the spindle becomes heavier as the axial length increases, and the whirling speed (the whirling speed is a rotational speed calculated from the natural frequency of the spindle, and the vibration becomes large when the spindle is rotated in this whirling speed range) of the spindle decreases. In addition, the supply of oil particles from the oil supplying nozzle is hindered by the air curtain (the air curtain is a wall of high-speed air flow in the circumferential direction generated by friction between air and the inner ring outer diameter surface rotating at high-speed) generated by high-speed rotation. As a result, it is hard to reliably supply lubricating oil into the bearing. As described above, the oil-air lubrication of the related arts has such structural and functional problems.

As another oil-air lubrication system, as illustrated in FIG. 10, there is known a system which uses an outer ring oil-supply type bearing 110 in which an oil groove 112 is formed on the outer circumferential surface of the outer ring 111 in the circumferential direction, and a plurality of oil holes 113 directed in a radial direction are formed at the same axial position as the oil groove 112 (for example, see Patent Document 1). In such an outer ring oil-supply type bearing, even in a case where the bearing is used at high-speed rotation, the supply of the oil particles is not hindered by the air curtain. For this reason, it is possible to stably use the spindle even at high-speed rotation.

FIG. 11 is a schematic view of the spindle in each case of the oil-air lubrication using the nozzle piece 101 and the oil-air lubrication with the outer ring oil-supplying specification. The upper half of FIG. 11 is a spindle 120 of the oil-air lubrication with the outer ring oil-supplying specification, and the lower half is a spindle 120A of the oil-air lubrication using the nozzle piece 101. Incidentally, in FIG. 11, reference sign 121 denotes a rotary shaft, and reference sign 122 denotes a rotor of a motor fitted to the rotary shaft 121. In this way, when the oil-air lubrication uses the nozzle piece 101, a spacer having a certain axial length or more is required to supply the lubricating oil from the side surface of the bearing 100. On the other hand, with the outer ring oil-supplying specification, an oil supplying spacer is not required. Thus, the nozzle piece can be reduced in size, and the structure of the spacer can be simplified, and the axial length of the spacer 123 can be shortened compared to the case of the specification using the nozzle piece. Accordingly, in the outer ring oil-supplying specification, it becomes simple to design and machine the spindle and the oil supplying component and manage the components, and the reduction of overall cost can be achieved in designing, manufacturing and managing of the machine tools. Additionally, the axial length can be shortened to reduce the size of the machine tool and improve the whirling speed of the spindle. As described above, the outer ring oil-supply type bearing has many advantages compared with a conventional side surface oil-supply type bearing.

PRIOR ART DOCUMENT

Patent Document

Patent Document 1: Japanese Unexamined Patent Application Publication No. 2013-79711

SUMMARY OF THE INVENTION

Problems to be Solved by the Invention

Incidentally, the ball bearing for the machine tool spindle is used under various conditions according to the specifications of the spindle. When the number of revolutions of the bearing or the initial preload and the external load during machining are different, the internal state (the contact angle, the size of the contact ellipse of the contact part between the inner ring groove and the ball or the outer ring groove and the ball, the contact pressure, or the like) of the used bearing is different. For this reason, in the ball bearing to be used under various conditions, it is desirable to improve the lubricity of the bearing. Particularly, it is desirable that the lubricating state of the sliding contact part between the ball and the retainer is held excellently during the high-speed rotation.

The invention has been made in consideration of the above-described problems, and an object thereof is to provide a ball bearing which is provided in an outer ring of an outer ring oil-supply type bearing and in which excellent lubricity during high-speed rotation and low noise and low vibration can be achieved by properly setting axial positions and circumferential positions of a plurality of radial holes, and a spindle device for a machine tool.

Means for Solving the Problems

The above object of the invention is achieved with the following configuration.
(1) A ball bearing including:
an inner ring with an inner ring raceway groove on an outer circumferential surface;
an outer ring with an outer ring raceway groove on an inner circumferential surface;
a plurality of balls which are arranged in a rollable manner between the inner ring raceway groove and the outer ring raceway groove; and
a retainer with a plurality of pockets for retaining the plurality of respective balls, wherein
the outer ring includes a plurality of radial holes which penetrate from the outer circumferential surface to the inner circumferential surface in the radial direction to supply lubricating oil, such that the ball bearing is lubricated by the lubricating oil,
when inner diameter side opening portions of the plurality of radial holes are projected on an outer circumferential surface of the retainer along extension lines of central lines of the racial holes, at least parts of the projected inner diameter side opening portions are positioned within an area of two circles formed by connecting each of axial end portions of respective pockets of the retainer in a rotational axial direction of the ball bearing, and
when the central line of any one radial hole among the plurality of radial holes coincides with a circumferential phase of a center of the ball, any other radial hole is formed such that when the inner diameter side opening portion of the other radial hole is projected on the outer circumferential surface of the retainer along the extension line of the central line of the radial hole, the projected inner diameter side opening portion is separated from the ball and the inner circumferential surface of the pocket when viewed from a radial direction of the ball bearing, and the central line of the other radial hole overlaps with the pocket when viewed from the axial direction of the ball bearing.
(2) The ball bearing according to (1), wherein
a concave groove communicating with the radial hole is formed along a circumferential direction in an outer circumferential surface of the outer ring.
(3) The ball bearing according to (2), wherein
in the outer circumferential surface of the outer ring, annular grooves are formed on both axial sides sandwiching the concave groove along the circumferential direction, and annular seal members are respectively arranged in each of the annular grooves.
(4) The ball bearing according to any one of (1) to (3), wherein
a diameter of the radial hole is 0.5 to 1.5 mm.
(5) The ball bearing according to any one of (1) to (4), wherein
in the radial hole, an opening area of the inner diameter side opening portion is larger than an opening area of the outer diameter side opening portion.
(6) A spindle device for a machine tool including:
the ball bearing according to any one of (1) to (5).

Effect of the Invention

According to the ball bearing of the invention, the outer ring includes the plurality of radial holes which penetrate from the outer circumferential surface to the inner circumferential surface in the radial direction to supply the lubricating oil. When the inner diameter side opening portions of the plurality of radial holes are projected on the outer circumferential surface of the retainer along the extension line of the central lines of the radial holes, at least parts of the projected inner diameter side opening portions are positioned within the area of two circles formed by connecting the axial end portions of the pockets of the retainer in the rotational axial direction of the ball bearing. In addition, when the central line of any one radial hole of the plurality of radial holes coincide with the circumferential phase of the center of the ball, any other radial hole is formed such that when the inner diameter side opening portion is projected on the outer circumferential surface of the retainer along the extension line of the central line of the radial hole, the projected inner diameter side opening portion is separated from the ball and the inner circumferential surface of the pocket when viewed from the radial direction of the ball bearing, and the central line of the other radial hole overlaps with the pocket when viewed from the axial direction of the ball bearing. Accordingly, the lubricating oil is supplied from any one radial hole to the sliding contact part between the ball and the retainer, and also from any other radial hole, sufficient lubricating oil is supplied to the sliding contact part between the ball and the retainer through the outer circumferential surface of the retainer. Therefore, the excellent lubricating state can be maintained to prevent the seizure of the bearing. In addition, the noise and the vibration can be reduced without completely blocking the flow of the compressed air.

BRIEF DESCRIPTION OF DRAWINGS

FIGS. 3A to 3C are views illustrating a ball and a retainer when viewed from the outer diameter side, wherein FIG. 3A illustrates the condition of the area where the inner diameter side opening portion of the other radial hole can be arranged, FIG. 3B illustrates the condition of the area where the central line of the other radial hole can be arranged, and FIG. 3C illustrates the area where the inner diameter side opening portion of the other radial hole can be arranged in consideration of both conditions of FIGS. 3A and 3B.

FIG. 4A is a sectional view of the ball bearing illustrating the axial outermost position of the radial hole on a counter bore side, and FIG. 4B is a sectional view of the ball bearing illustrating the axial outermost position of the radial hole on a side opposite to the counter bore side.

FIG. 11 is a sectional view in which the upper half is a spindle of the oil-air lubrication with the outer ring oil-supplying specification, and the lower half is a spindle of the oil-air lubrication using the nozzle piece.

DESCRIPTION OF EMBODIMENTS

Hereinafter, a ball bearing and a spindle device for a machine tool according to one embodiment of the invention will be described in detail based on the drawings.

Figure 1:
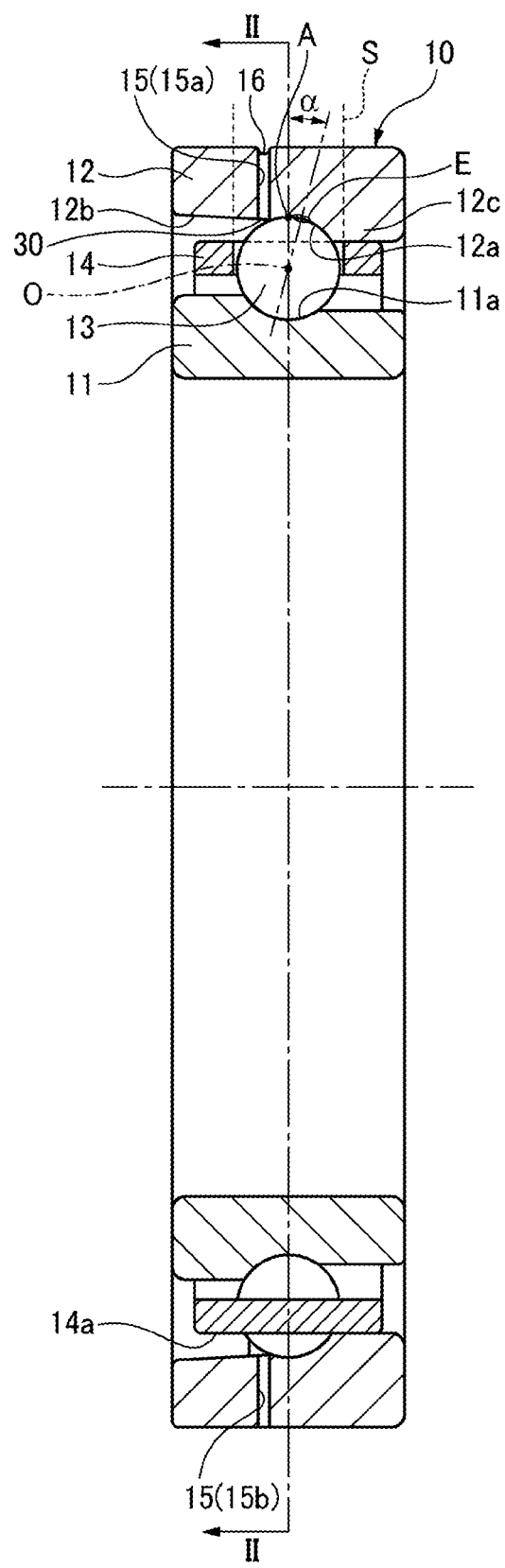
FIG. 1 is a sectional view of a ball bearing according to one embodiment of the invention.

As illustrated in FIG. 1, an angular ball bearing 10 according to the present embodiment is applicable to a spindle device for a machine tool and includes an inner ring 11 with an arc-shaped inner ring raceway groove 11a on the outer circumferential surface, an outer ring 12 with an arc-shaped outer ring raceway groove 12a on the inner circumferential surface, a plurality of balls 13 which are arranged with a predetermined contact angle α in a rollable manner between the inner ring raceway groove 11a and the outer ring raceway groove 12a, and an outer ring guide type retainer 14 with a cylindrical pocket P for retaining the plurality of balls 13. A counter bore 12b with an inclined part of which the diameter reduces gradually from the axial end surface to the outer ring raceway groove 12a is provided on one inner circumferential surface of the outer ring 12 in the axial direction, and a groove shoulder 12c having a uniform inner diameter is formed on the other inner circumferential surface in the axial direction. In the present embodiment, the outer circumferential surface 14a of the retainer 14 is formed to have a uniform outer diameter in the axial direction.

The angular ball bearing 10 is an outer ring oil-supply type bearing, and the outer ring 12 includes a plurality of radial holes 15 (15a, 15b) which penetrate from the outer circumferential surface to the inner circumferential surface in the radial direction to supply lubricating oil. In addition, concave groove 16 which communicate with the plurality of radial holes 15 are formed on the outer circumferential surface of the outer ring 12 along the circumferential direction. Accordingly, in the angular ball bearing 10, oil particles and lubricating air which are supplied from an oil supply passage of a housing (not illustrated) are directly supplied to the ball 13 through the concave groove 16 and the radial hole 15 of the outer ring 12, and oil-air lubrication is performed.

Incidentally, instead of being provided in the outer ring 12, the circumferential concave groove may be formed at the position of the oil supply passage opening communicating with the radial hole 15 in the inner circumferential surface of the housing.

In this way, the plurality of radial holes 15 are provided so that the lubricating oil can uniformly spread over the entire raceway surface without unevenness, and the reliability of the lubrication during the high-speed rotation can be improved.

In addition, the outer ring 12 is well cooled in a phase close to the radial hole 15, and the cooling is weak in the phase far from the radial hole 15. Thus, a temperature difference is generated by the phase of the outer ring 12 to affect the dimensional accuracy of the bearing. For this reason, the plurality of radial holes 15 are provided so that the temperature fluctuation of the outer ring 12 of the bearing can be prevented.

Figure 2:
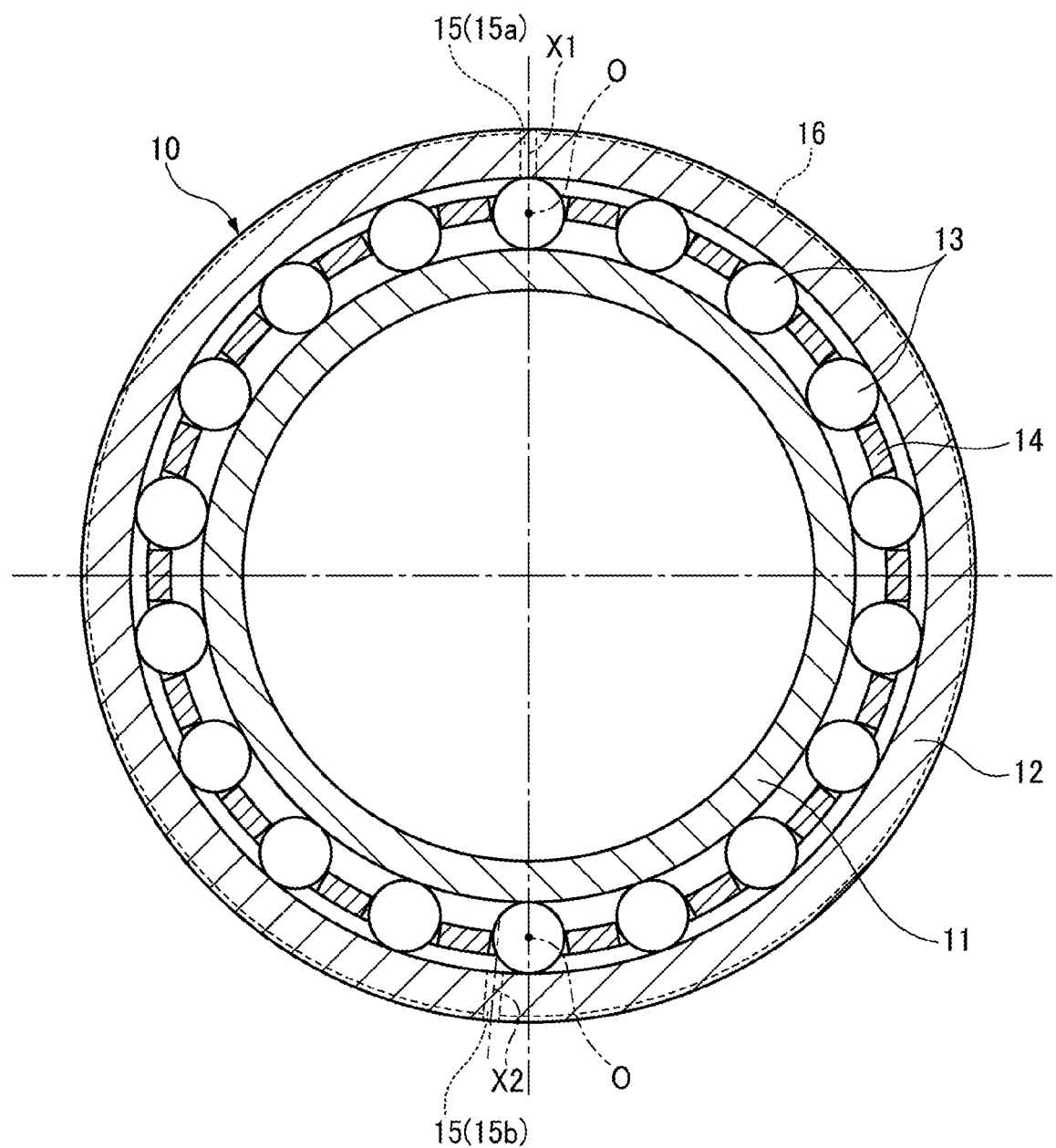
FIG. 2 is a sectional view of the ball bearing as seen along line II-II of FIG. 1.

As illustrated in FIG. 2, in the present embodiment, when the inner diameter side opening portions 30 of the plurality of radial holes 15 are projected on the outer circumferential surface of the retainer 14 along the extension lines of the central lines X1 and X2 of the radial holes 15, at least parts of the projected inner diameter side opening portion 30 are positioned within the area (in a dotted line S illustrated in FIG. 1) of two circles L (see FIGS. 3A to 3C) formed by connecting each of the axial end portions of the respective pockets P of the retainer 14 in the rotational axial direction of the ball bearing 10.

Generally, the sliding contact part (the inner surface of the pocket P of the retainer 14) between the ball 13 and the retainer 14 is in a bad lubricating state. Particularly, in the bearing for the machine tool spindle, in order to avoid the temperature increase and the temperature fluctuation of the bearing, the amount of the lubricating oil supplied to the bearing is extremely small. Under such conditions, sufficient lubricating oil is hardly supplied to the sliding contact part between the ball 13 and the retainer 14, and the seizure may occur due to the lubrication failure of the sliding contact pan between the ball 13 and the retainer 14.

Therefore, it is desirable that the lubricating oil is supplied to the outer ring oil-supply type bearing such that the lubricating state of the sliding contact part between the ball 13 and the retainer 14 is maintained excellently. For this reason, when the inner diameter side opening portions 30 of the radial holes 15 are projected on the outer circumferential surface of the retainer 14 along the extension lines of the central lines X1 and X2 of the radial holes 15, the projected inner diameter side opening portions 30 are positioned within the area of two circles L formed by connecting each of the axial end portions of the respective pockets P of the retainer 14 in the rotational axial direction of the ball bearing 10. Thus, sufficient lubricating oil is supplied to the sliding contact part between the ball 13 and the retainer 14, to maintain the excellent lubricating state and prevent the seizure of the bearing.

If the inner diameter side opening portions 30 of the above-described projected radial holes 15 are outside the above-described area of the two circles, the vibration and the noise increase as well as the lubrication failure occurs in the sliding contact part between the ball 13 and the retainer 14. Specifically, the pressure of the compressed air acts on a point separated from the axial central position of the retainer 14, to generate a couple of force to incline the posture of the retainer 14. Desirably, the retainer 14 in the bearing during the rotation is typically rotated in the same posture. However, the posture of the retainer 14 is changed with time by the couple of force, and the vibration or the noise caused by the movement of the retainer 14 increases.

In the present embodiment, at least parts of the projected inner diameter side opening portions 30 of the plurality of radial holes 15 may be positioned within the area (in the dotted line S of FIGS. 4A and 4B) of two circles L formed by connecting each of the axial end portions of the respective pockets P of the retainer 14 in the rotational axial direction of the ball bearing 10. That is, as illustrated in FIG. 4A, at least parts of the projected inner diameter side opening portions 30 of the plurality of radial holes 15 may overlap with a circle L on the counter bore side formed by connecting each of the axial end portions of the respective pockets P of the retainer 14 in the rotational axial direction of the ball bearing 10. Alternatively, as illustrated in FIG. 4B, at least parts of the projected inner diameter side opening portions 30 of the plurality of radial holes 15 may overlap with a circle L on a side opposite to the counter bore side formed by connecting each of the axial end portions of the respective pockets P of the retainer 14 in the rotational axial direction of the ball bearing 10.

When at least parts of the inner diameter side opening portions 30 of the radial hole 15 are positioned within the outer ring raceway groove 12a, the inner diameter side opening portions 30 of the radial hole 15 are preferably formed at the contact point between the outer ring raceway groove 12a and the ball 13 when a preload or an external load is applied to the bearing or when the position which does not interfere with a contact ellipse E. When the radial hole 15 is formed as described above, the stress concentration caused by the contact between the edge portion of the radial hole 15 and the ball 13 can be prevented, and the separation of the ball 13 or the outer ring raceway groove 12a can be prevented. Incidentally, the contact ellipse E is contact ellipse generated only by the initial preload, and more preferably, the contact ellipse is contact ellipse generated by the bearing internal load including the external load generated during machining the workpiece.

Figure 3A:
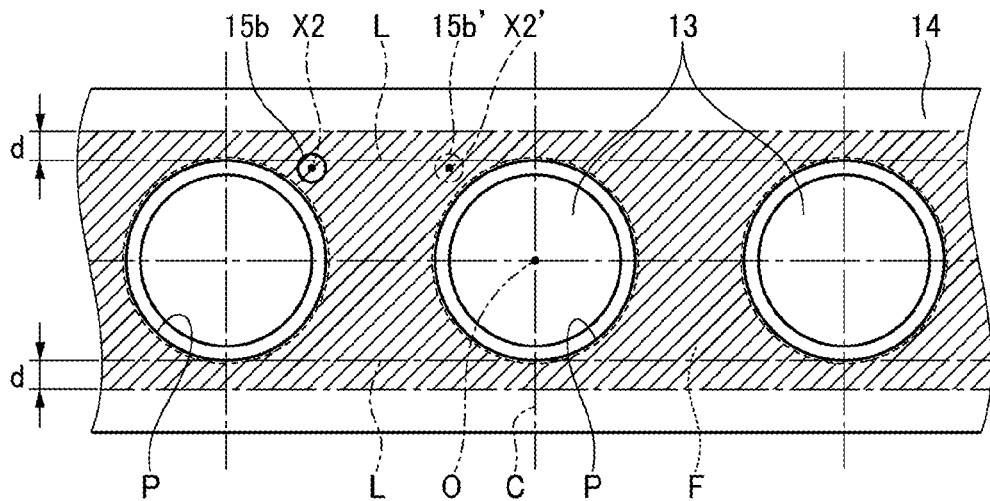
Figure 3B:
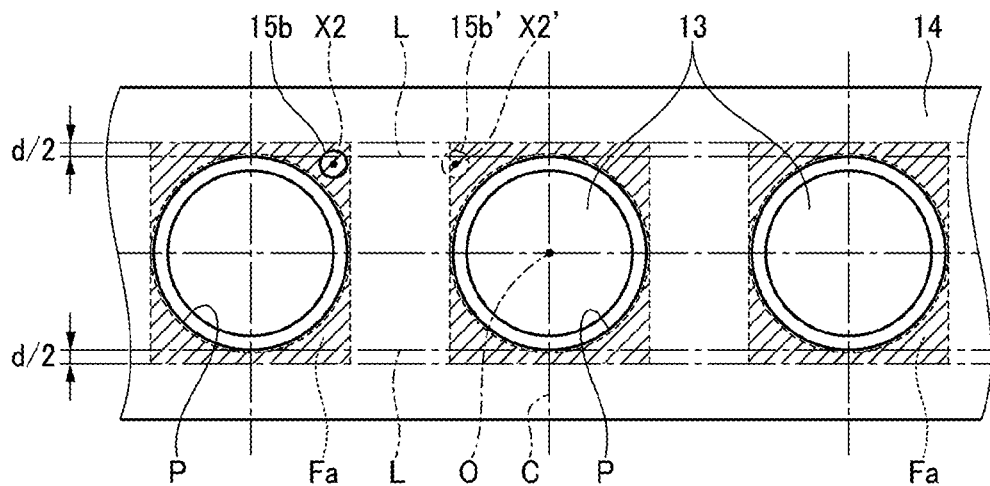
Figure 3C:
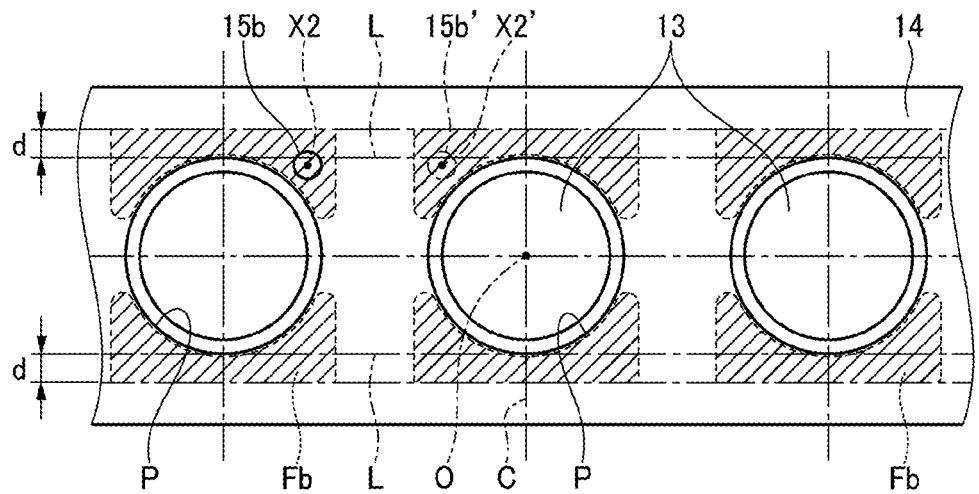

With reference to FIGS. 2 to 3C, when the central line X1 of any one radial hole 15a of the plurality of radial holes 15a and 15b coincides with the circumferential phase of the center O of the ball 13, two conditions are satisfied which mean that (i) as illustrated in FIG. 3A, any other radial hole 15b is formed such that when the inner diameter side opening portion 30 of the radial hole 15b is projected on the outer circumferential surface of the retainer 14 along the extension line of the central line X2 of the radial hole 15b, the projected inner diameter side opening portion 30 is separated from the ball 13 and the inner circumferential surface of the pocket P when viewed from the racial direction of the ball bearing 10, and (ii) as illustrated in FIG. 3B, the central line X2 of any other radial hole 15b overlaps with the pocket P when viewed from the axial direction of the ball bearing 10. In addition, as illustrated in FIGS. 3A and 3B, the positions of the other radial hole 15b and the central line X2 of the other radial hole 15b may be the positions of 15b' and X2' in the drawings, respectively.

That is, in the condition (i), the above-described projected inner diameter side opening portion 30 of any other radial hole 15b can be arranged within the area F of FIG. 3A. In addition, the central line X2 of the other radial hole 15b is positioned to be separated from the line C passing through the center O of the ball 13. Incidentally, in FIGS. 3A to 3C, "d" indicates the hole diameter of the radial hole 15b.

In the outer ring oil supply system, when the radial hole 15 is present in the outer ring raceway groove 12a, and the ball 13 passes on the radial hole 15 during bearing rotation, the radial hole 15 is closed physically. Accordingly, the vibration and the noise are generated. This vibration is air vibration generated by periodically repeating a phenomenon in which (1) the radial hole 15 is closed when the ball 13 passes just on the radial hole 15 to block the flow of the compressed air, and then (2) the flow restarts after the ball 13 passes just on the radial hole 15.

The air vibration tends to become larger as the number of the balls 13 passing on the radial holes 15 once increases, and when the vibration increases, the noise increases, and the machining accuracy of the spindle is deteriorated.

Particularly, the noise is known to be a notable problem. In the area where the outer ring oil-supply type bearing is used mainly, and the number of revolutions is 10000 min$^{-1}$ or more, a problem easily occurs in which the frequency of the generated noise is about several thousand Hz, and the noise of the frequency band in which the sensitivity of the human ears is the highest is generated.

When the plurality of radial holes 15 are closed simultaneously by the balls 13, the supply amount of the lubricating oil while passing is reduced remarkably. Further, after the balls 13 pass, the lubricating oil stored in the radial hole 15 is supplied once. Stirring resistance of the lubricating oil increases due to instantaneous excessive supply of the lubricating oil, and thus the temperature of the bearing outer ring rises remarkably. Accordingly, the machining accuracy is deteriorated, or the risk of the seizure due to the abnormal temperature rise increases.

For this reason, it is desirable that the balls 13 do not pass on the plurality of radial holes 15 simultaneously during bearing rotation. Therefore, when the central line X1 of any one radial hole 15a coincides with the circumferential phase of the center O of the ball 13, and the inner diameter side opening portion 30 of any other radial hole 15b is projected on the outer circumferential surface of the retainer 14 along the extension lines of the central lines X1 and X2 of the radial holes 15, the projected inner diameter side opening portion 30 is separated from the ball 13 and the inner circumferential surface of the pocket P when viewed from the radial direction of the ball bearing 10. Thus, the central line X2 of other radial hole 15b is separated from the circumferential phase (the line C of FIGS. 3A to 3C) of the center O of the ball 13. That is, when any one radial hole 15a is closed by the ball 13, the other radial hole 15b is open so that the flow of the compressed air is not completely blocked, and the noise and the vibration can be reduced.

Incidentally, when the outer ring 12 includes three or more radial holes 15, and the central line X1 of any one radial hole 15a coincides with the circumferential phase of the center O of the ball 13, more desirably, all of the above-described projected remaining other radial holes 15b are positioned in the area F.

In addition, in the condition (ii), as illustrated in FIG. 3B, the central line X2 of any other radial hole 15b is positioned within the area Fa overlapping with the pocket P when viewed from the axial direction of the ball bearing 10. Therefore, in order to satisfy the above-described two conditions (i) and (ii), when viewed from the radial direction of the ball bearing 10, the above-described projected inner diameter side opening portion 30 of any other radial hole 15b becomes the area Fb illustrated in FIG. 3C in a case where the hole diameter of the radial hole is adopted as illustrated. Further, when the hole diameter of the radial hole is changed, the illustrated area Fb is changed.

Accordingly, the inner diameter side opening portion 30 of the other radial hole 15b is arranged to be positioned close to the ball 13 and the inner circumferential surface of the pocket P. Thus, the lubricating oil supplied from the other radial hole 15 is supplied to the sliding contact part between the ball 13 and the inner circumferential surface of the pocket P through the outer circumferential surface of the retainer 14, thereby securing stable lubricity.

In the present embodiment, in consideration of the supply of the lubricating oil and the prevention of the interference with the contact ellipse E, the diameter of the radial hole 15 is set to 0.5 to 1.5 mm. In the present embodiment, the radial hole 15 has a uniform diameter over the radial direction.

In a bearing device 1 configured in this way, the outer ring 12 includes the plurality of radial holes 15 which penetrate from the outer circumferential surface to the inner circumferential surface in the racial direction to supply the lubricating oil. Further, when the inner diameter side opening portions 30 of the plurality of radial holes 15 are projected on the outer circumferential surface of the retainer 14 along the extension line of the central lines X1 and X2 of the radial holes 15, at least parts of the projected inner diameter side opening portions 30 are positioned within the area of two circles L formed by connecting each of the axial end portions of the respective pockets P of the retainer 14 in the rotational axial direction of the ball bearing 10. In addition, when the central line X1 of any one radial hole 15a of the plurality of radial holes 15 coincide with the circumferential phase of the center O of the ball 13, any other radial hole 15b is formed such that when the inner diameter side opening portion 30 is projected on the outer circumferential surface of the retainer 14 along the extension line of the central line X2 of the radial hole 15b, the projected inner diameter side opening portion 30 is separated from the ball 13 and the inner circumferential surface of the pocket P when viewed from the radial direction of the ball bearing 10, and the central line X2 of any other radial hole 15b overlaps with the pocket P when viewed from the axial direction of the ball bearing 10. Accordingly, the lubricating oil is supplied from any one radial hole 15a to the sliding contact part between the ball 13 and the retainer 14, and also from any other radial hole 15b, sufficient lubricating oil is supplied to the sliding contact part between the ball 13 and the retainer 14 through the outer circumferential surface of the retainer 14. Therefore, the excellent lubricating state can be maintained to prevent the seizure of the bearing. In addition, the noise and the vibration can be reduced without completely blocking the flow of the compressed air.

Figure 5:
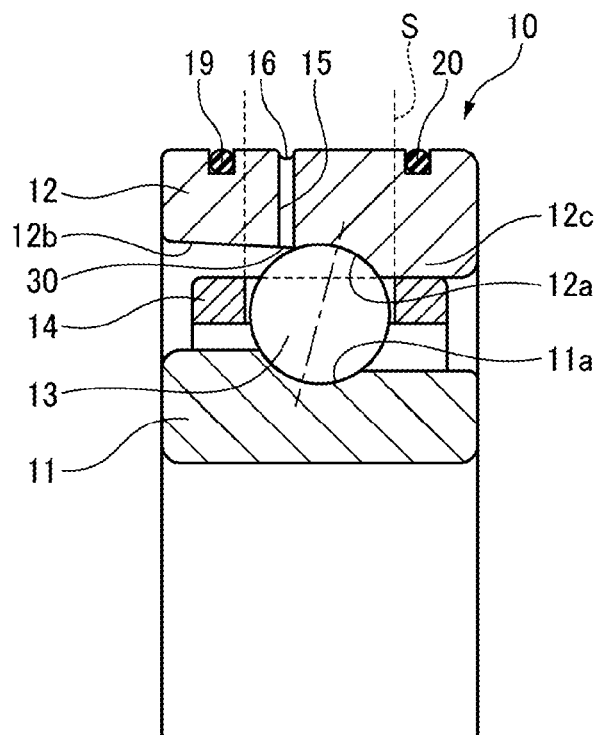
FIG. 5 is a sectional view of a ball bearing according to a first modification of the present embodiment.

In the present embodiment, as in a first modification illustrated in FIG. 5, in the outer circumferential surface of the outer ring 12, annular grooves 19 may be formed on both axial sides sandwiching the concave groove 16 along the circumferential direction, and a seal member 20 which is an annular elastic member such as an O ring may be arranged in each of the annular grooves 19, thereby preventing the oil leakage.

Figure 6:
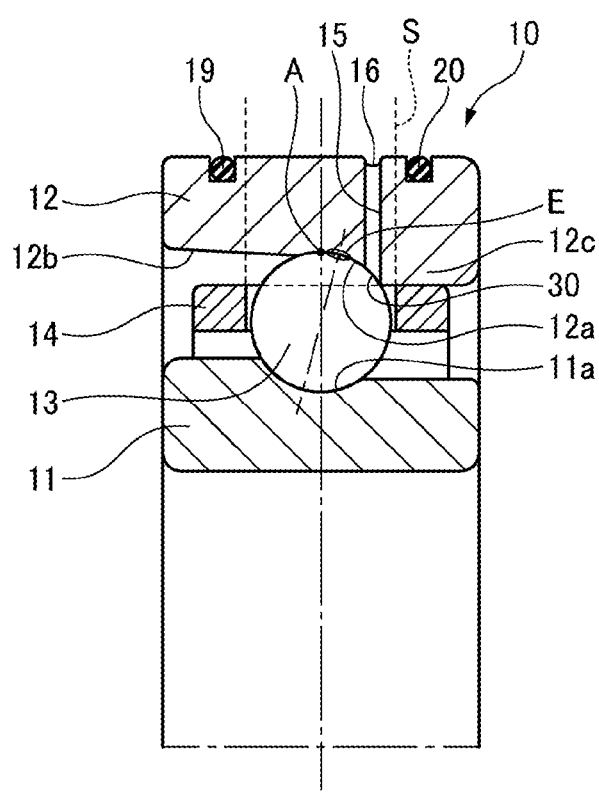
FIG. 6 is a sectional view of a ball bearing according to a second modification of the present embodiment.

In the present embodiment, the projected inner diameter side opening portions 30 of the radial holes 15 may be within the range illustrated in an area S of FIG. 1. In FIG. 1, the inner diameter side opening portion 30 is formed on the counter bore side regarding a groove bottom A of the outer ring raceway groove 12a. As in a second modification illustrated in FIG. 6, the inner diameter side opening portion 30 may be formed on a side opposite to the counter bore side with respect to the groove bottom A of the outer ring raceway groove 12a. In addition, any one radial hole 15 may be formed on the counter bore side with respect to the groove bottom A of the outer ring raceway groove 12a, and any other radial hole 15 may be formed on a side opposite to the counter bore side with respect to the groove bottom A of the outer ring raceway groove 12a.

Figure 7:
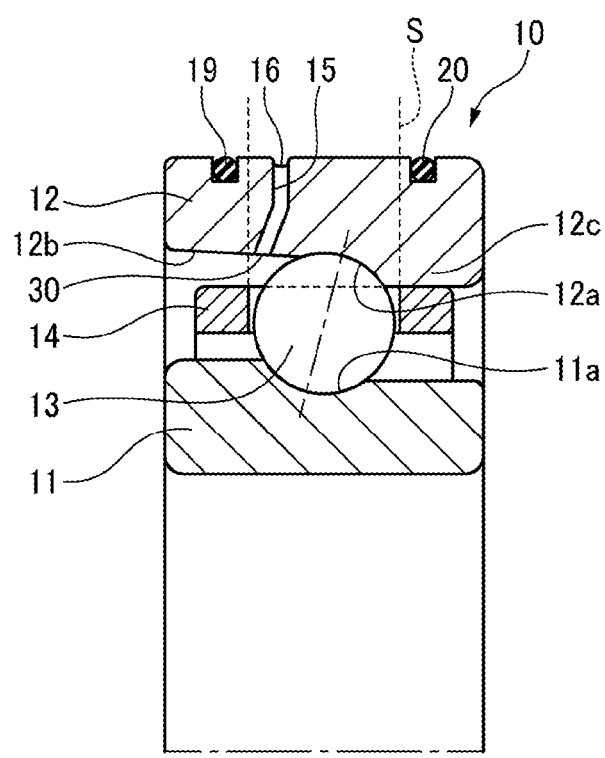
FIG. 7 is a sectional view of a ball bearing according to a third modification of the present embodiment.

The radial hole 15 may penetrate from the outer circumferential surface of the outer ring to the inner circumferential surface in the radial direction. The radial hole may be formed along the radial direction (parallel to a radial sectional plane) of the present embodiment or may be formed to be inclined in the rotational axial direction or the circumferential direction of the bearing. For example, as in a third modification illustrated in FIG. 7, the radial hole 15 may be formed to be bent in the axial direction in the middle of the radial direction of the bearing.

Figure 8A:
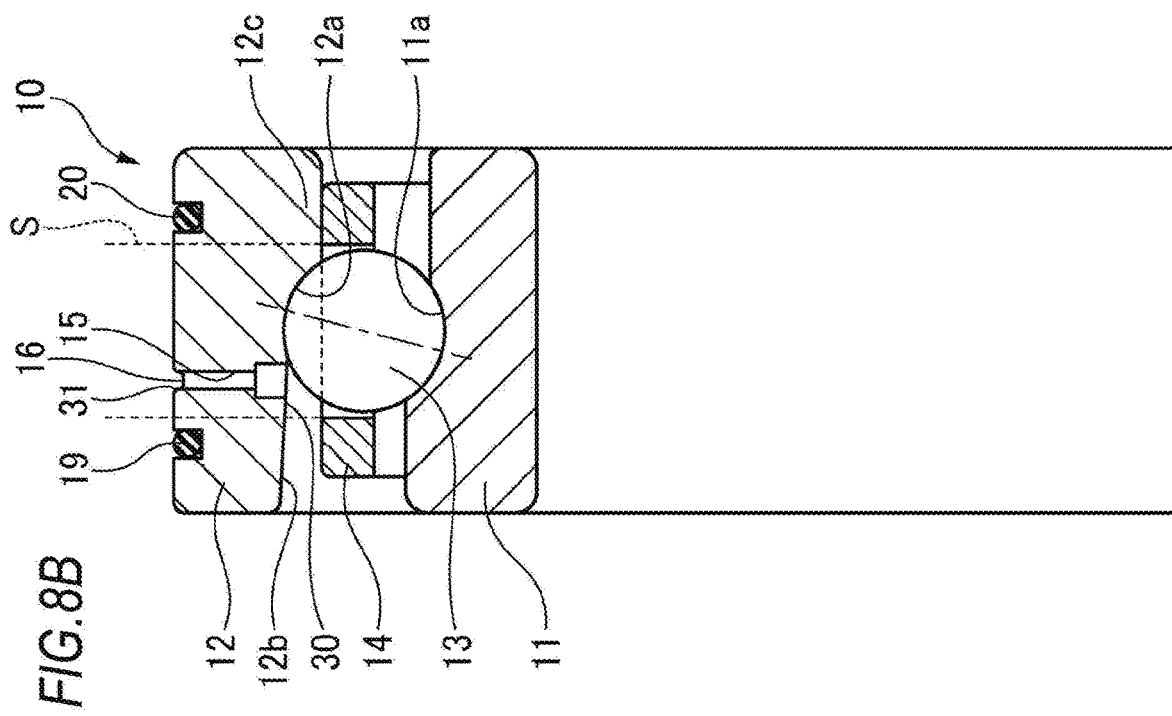
FIG. 8A is a sectional view of a ball bearing according to a fourth modification of the present embodiment.
Figure 8B:
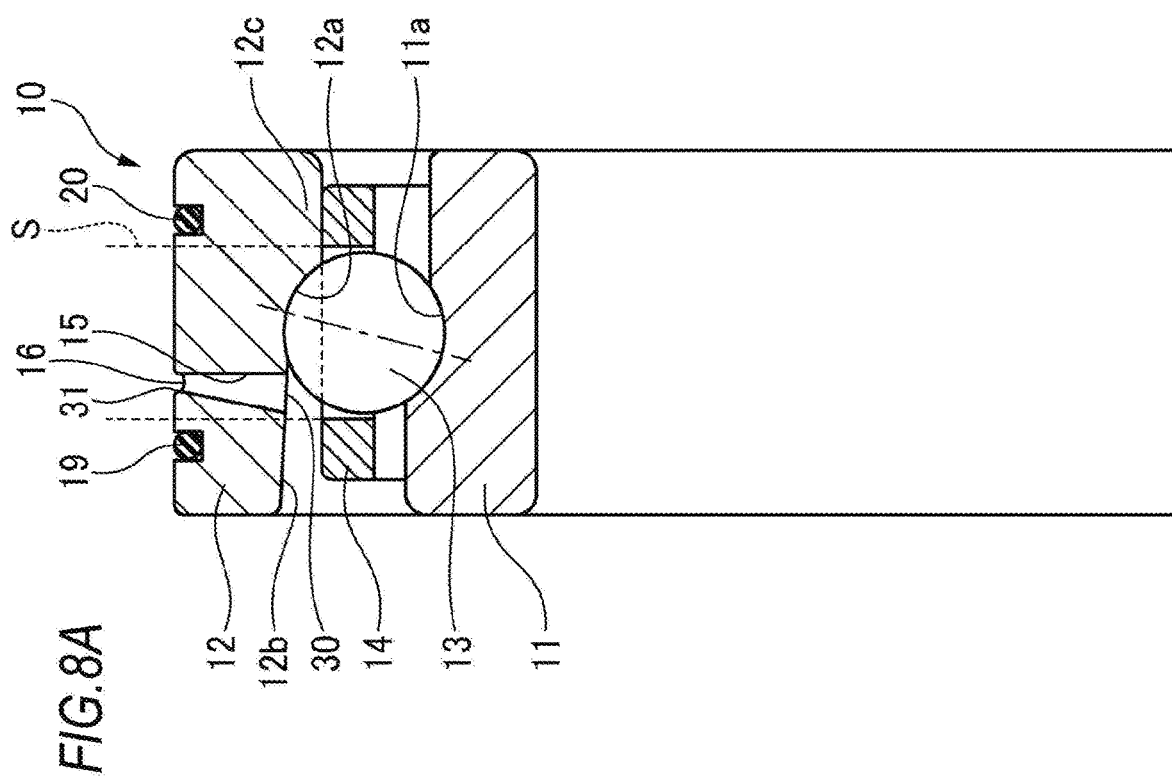
FIG. 8B is a sectional view of a ball bearing according to a fifth modification of the present embodiment.
Figure 9A:
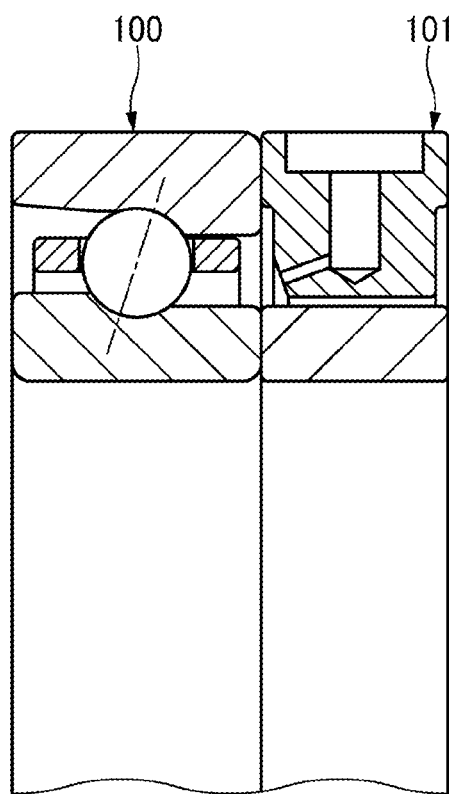
FIGS. 9A and 9B are a sectional view illustrating a oil-air lubrication of the related arts using a nozzle piece.
Figure 9B:
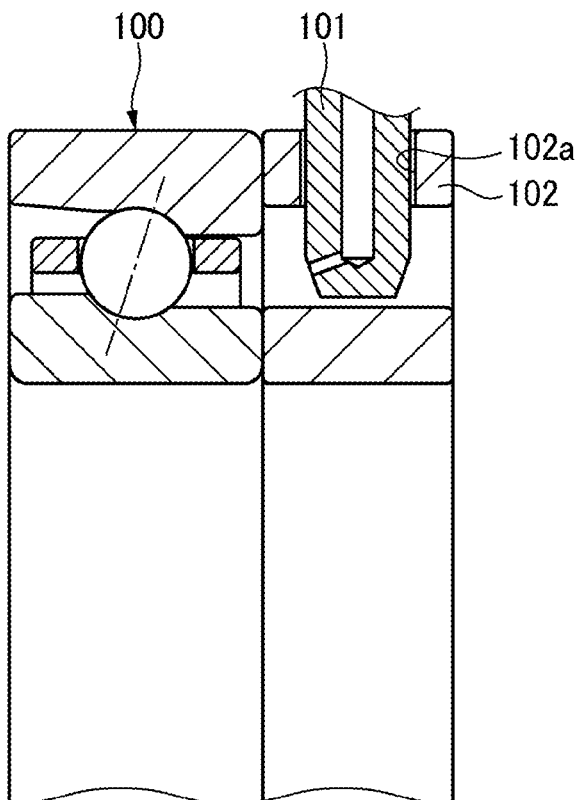
Figure 10:
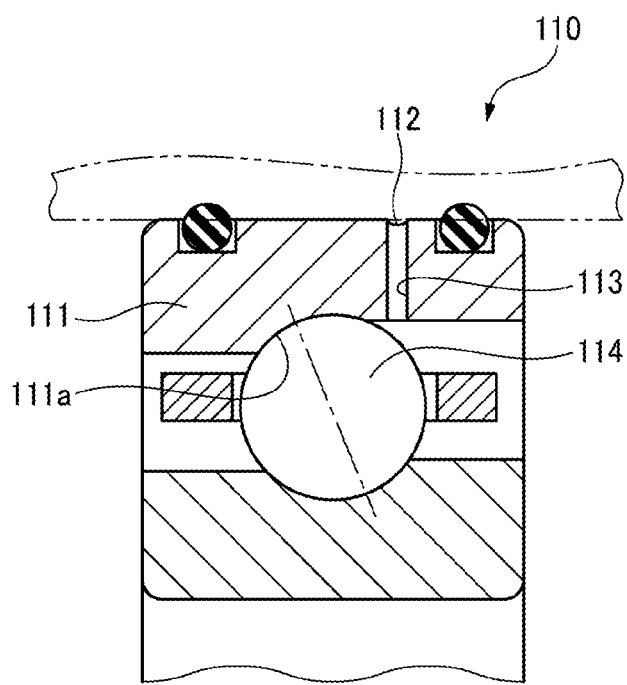
FIG. 10 is a sectional view of the ball bearing of the oil-air lubrication with an outer ring oil-supplying specification.

As in fourth and fifth modifications illustrated in FIGS. 8A and 8B, the radial hole 15 may be formed such that the opening area of the inner diameter side opening portion 30 is wider than the opening area of an outer diameter side opening portion 31. In the fourth modification, the diameter of the radial hole 15 is enlarged such that the area is gradually enlarged from the outer diameter side opening portion 31 to the inner diameter side opening portion 30. In the fifth modification, the radial hole 15 is formed in a stepped shape such that the opening area of the inner diameter side opening portion 30 is larger than the opening area of the outer diameter side opening portion 31. That is, in the outer ring oil-supply type rolling bearing, the lubricating oil is directly supplied to the ball 13 through the radial hole 15. Thus, although the supply air pressure is lowered near the inner diameter side opening portion 30, the lubricating oil can be supplied to the ball 13. For this reason, by lowering the air pressure of the inner diameter side opening portion 30, the collision of the high-pressure air against the ball 13 can be prevented, and the noise during the rotation of the bearing can be reduced.

In the second to fifth modifications illustrated in FIGS. 6 to 8B, the seal member 20 is arranged in the outer circumferential surface of the outer ring 12. However, similarly to FIG. 1, the seal member may not be provided.

The invention is not limited to the above-described embodiments and may be modified or improved appropriately.

Oil-mist lubrication may be adopted in addition to the oil-air lubrication as a method of supplying the lubricating oil into the racial hole of the outer ring. In some cases, oil jet lubrication may be adopted. However, in a grease supplying method of supplying grease from the radial hole 15 of the outer ring 12 by using the lubricant supplying device around the bearing or outside the spindle, when the radial hole 15 is formed to be open in the outer ring raceway groove 12a, the grease which is a semisolid containing a thickener is supplied into the outer ring raceway groove 12a.

In this case, since the grease is bitten into the outer ring raceway groove 12a, the stirring resistance causes problems such as the increase of the torque and the abnormal heat generation. Particularly, these problems easily occur in the high-speed rotation as in the present embodiment. Therefore, an oil lubricating method of supplying the lubricating oil not containing the thickener is desirable in the invention.

The ball bearing of the invention is not limited to those applied to the spindle device for the machine tool and may be applied as a ball bearing of a general industrial machine or a high-speed rotating device such as a motor.

This application is based on Japanese Patent Application No. 2016-153246 filed on Aug. 3, 2016, the contents of which are incorporated herein by reference.

DESCRIPTION OF REFERENCE NUMERALS

10: angular ball bearing (ball bearing)
11: inner ring
11a: inner ring raceway groove
12: outer ring
12a: outer ring raceway groove
12b: counter bore
12c: groove shoulder
13: ball
14: retainer
15, 15a, 15b: radial hole
16 concave groove
E: contact ellipse

The invention claimed is:
1. A ball bearing comprising:
an inner ring with an inner ring raceway groove on an outer circumferential surface;
an outer ring with an outer ring raceway groove on an inner circumferential surface;
a plurality of balls which are arranged in a rollable manner between the inner ring raceway groove and the outer ring raceway groove; and
a retainer with a plurality of pockets for retaining the plurality of respective balls, wherein:

the outer ring includes a plurality of radial holes which penetrate from the outer circumferential surface to the inner circumferential surface in the radial direction to supply lubricating oil, such that the ball bearing is lubricated by the lubricating oil;

when inner diameter side opening portions of the plurality of radial holes are projected on an outer circumferential surface of the retainer along extension lines of central lines of the radial holes, at least parts of the projected inner diameter side opening portions are positioned within an area of two circles formed by connecting each of axial end portions of respective pockets of the retainer in a rotational axial direction of the ball bearing; and when the central line of any one radial hole among the plurality of radial holes coincides with a circumferential phase of a center of the ball, any other radial hole is formed such that when the inner diameter side opening portion of the other radial hole is projected on the outer circumferential surface of the retainer along the extension line of the central line of the radial hole, the projected inner diameter side opening portion is separated from the ball and the inner circumferential surface of the pocket when viewed from a radial direction of the ball bearing, and the central line of the other radial hole overlaps with the pocket when viewed from the axial direction of the ball bearing.

2. The ball bearing according to claim 1, wherein
a concave groove communicating with the radial hole is formed along a circumferential direction in an outer circumferential surface of the outer ring.

3. The ball bearing according to claim 2, wherein
in the outer circumferential surface of the outer ring, annular grooves are formed on both axial sides sandwiching the concave groove along the circumferential direction, and annular seal members are respectively arranged in each of the annular grooves.

4. A spindle device for a machine tool comprising:
the ball bearing according to claim 3.

5. A spindle device for a machine tool comprising:
the ball bearing according to claim 2.

6. The ball bearing according to claim 1, a diameter of the radial hole is 0.5 to 1.5 mm.

7. A spindle device for a machine tool comprising:
the ball bearing according to claim 6.

8. The ball bearing according to claim 1, in the radial hole, an opening area of the inner diameter side opening portion is larger than an opening area of the outer diameter side opening portion.

9. A spindle device for a machine tool comprising:
the ball bearing according to claim 8.

10. A spindle device for a machine tool comprising:
the ball bearing according to claim 1.

* * * * *